United States Patent [19]

Howard

[11] Patent Number: 4,630,892

[45] Date of Patent: Dec. 23, 1986

[54] VARIABLE AREA LIGHT REFLECTING ASSEMBLY

[75] Inventor: Thomas C. Howard, Raleigh, N.C.

[73] Assignee: Synergetics, Inc., Raleigh, N.C.

[21] Appl. No.: 772,775

[22] Filed: Sep. 5, 1985

[51] Int. Cl.⁴ ........ G02B 17/00

[52] U.S. Cl. ........ 350/264

[58] Field of Search ........ 350/258–265

[56] References Cited

U.S. PATENT DOCUMENTS 284,559 9/1883 Hyatt ........ 350/264

284,963 9/1883 Hyatt ........ 350/263

*Primary Examiner*—Richard A. Wintercorn

*Attorney, Agent, or Firm*—Paul Overhauser

[57] ABSTRACT

Device for tracking daylight and projecting it into a building. The device tracks the sun and automatically adjusts both the orientation and area of the reflecting surface. The device may be mounted in either a wall or roof of a building. Additionally, multiple devices may be employed in a light shaft in a building, providing daylight to several different floors. The preferred embodiment employs a thin reflective film as the reflecting device. One edge of the reflective film is fixed, and the opposite end is attached to a spring-loaded take-up roller. As the sun moves across the sky, the take-up roller automatically adjusts the angle and surface area of the film. Additionally, louvers may be mounted at the light entrance to the device to reflect incoming daylight in an angle perpendicular to the device to provide maximum reflective capability when daylight enters the device at non-perpendicular angles.

25 Claims, 9 Drawing Figures

VARIABLE AREA LIGHT REFLECTING ASSEMBLY

This invention was developed with Government support under contract no. DE-AC02-83ER80050 awarded by the Department of Energy. The government has certain rights in this invention.

FIELD OF THE INVENTION

The present invention relates to a device for projecting diffuse skylight and beam sunlight deep into a building space, and more particularly pertains to a variable-area, light-reflecting assembly which tracks the sun as it moves across the sky throughout the day.

BACKGROUND OF THE INVENTION

Approximately five percent of the United States' primary energy is consumed providing illumination in commercial and industrial buildings. Roughly another three percent is consumed for cooling these buildings. As energy costs climb higher, methods of reducing lighting and cooling costs are becoming more important. The present invention provides a method for reducing building lighting and cooling costs by projecting daylight deep into the interior of a building space. This provides two distinct advantages. First, ordinary sources of artificial lighting which consume electrical energy can be reduced or eliminated. Second, the reduction of artificial light sources provides the ancillary benefit of reducing the heat which usually accompanies the lighting source, thus reducing cooling costs as well. In addition, since the color rendering and luminous efficacy of sunlight is generally superior to that of artificial light, sunlight provides more aesthetically pleasing light than artificial light.

Traditionally, clerestories, horizontal baffles (light shelves), glass blocks with built-in refracting prisms, and various configurations of louvers (venetian blinds) have been employed to project daylighting admitted through wall apertures into interior spaces. Also, light wells or atria have been traditionally used to admit daylight into multistory structures. Although beneficial, these methods are fraught with limitations.

Specifically, not all methods of projecting daylight into buildings actually result in energy savings due to inefficient designs. Other methods require that a building and its mechanical systems be specifically designed to accommodate the daylighting device. Still others are limited because they operate optimally only at one time during the day or one day during the year, since they do not account for the movement of the sun across the sky throughout the day or for different heights of the sun at different times during the year. Other daylighting devices are expensive to construct or unattractive when positioned on a building.

OBJECTS OF THE INVENTION

One object of the invention is to provide a daylight projecting device of a simple design capable of being easily installed in new or existing structures.

Another object of the invention is to provide a daylight projecting device which provides thermal resistance between the exterior and interior of a building.

Another object of the invention is to provide a daylight projecting device which can track the path of the sun across the sky to reflect the most intense light available.

Another object of the invention is to provide a daylight projecting device which evenly reflects daylight into a structure at an angle perpendicular to the device.

Another object of the invention is to provide a daylight projecting device which occupies little or no space customarily used by individuals inside a building, i.e. that area adjacent to the corner of an exterior wall and ceiling.

Another object of the invention is to provide a light reflecting surface which only occupies as little surface area as is necessary in order to provide all the necessary reflecting.

Another object of the invention is to provide a daylight projecting device which can be inexpensively constructed and maintained.

Another object of the invention is to provide a daylight projecting device with a variable exterior aperture which reduces the opening into the device to avoid overheating during periods of intense sunshine, yet opens fully when the solar source is weak, which can also be used on winter nights to suppress both radiant and convective heat transfer through the device.

Still other objects and advantages of the invention will become apparent to those of skill in the art after reading the following description of a preferred embodiment.

SUMMARY OF THE INVENTION

The invention solves many of the problems of other daylight reflective devices as noted above. The heart of the invention includes a reflective surface, a reflective surface adjustment means, and a means for controlling the extent of adjustment of the reflective surface adjustment means.

The reflective surface has an upper edge and a lower edge. The upper edge is positioned closer to the daylight source than the lower edge. The upper edge is also fixed, although it may be able to move, if necessary, as the lower edge is adjusted. The reflective surface may be a mirror, reflective prism, reflective film, or any other reflective material.

The reflective surface may be adjusted by moving the location of the lower edge so that light striking the reflective surface is always reflected through the interior aperture, regardless of the angle at which the light enters the exterior aperture. The precise angle of the reflective surface should be such that light is projected as far into the building as lighting is desired. As the altitude of the sun above the horizon changes throughout the day, the angle of the reflective surface is changed so that the light projected into the building always covers the same area. Also, louvers track the azimuth of the sun as it changes throughout the day so the light reflected into the building is at an angle perpendicular to the device.

DESCRIPTION OF THE INVENTION

The invention includes a reflective surface, the angle of which may be adjustably controlled. The reflective surface captures daylight from the exterior of a building and projects it into the interior of the building. The device may be placed in the roof or wall of a building. When placed in a wall, it is preferable to mount the device along the wall directly below the corner of the exterior wall and interior ceiling. The reflecting surface is adjusted so that the light captured by the device is reflected into the building as deeply as lighting is desired. The light may be upwardly reflected against the interior ceiling, which then reflects the light down into workspaces. Alternatively, the light may be downwardly reflected into a suspended light-diffusing ceiling, which disperses the light further.

When used to light multiple stories of a building via a light shaft, the device is positioned in a housing above the roof of the building. The captured light is reflected against fixed mirrors, which in turn, reflect the light down the light shaft into mirrors located along the corners of the interior walls and ceilings on each floor. The invention operates such that it is only necessary for the reflecting surface which actually captures the daylight to be able to track the sun to provide maximum efficiency. The remaining mirrors may be fixed.

In any of the above environments, the device may be used in combination with artificial lights to provide additional light. A light sensor may also be placed in the device or inside the building to automatically turn on artificial lights when the amount of light from the device falls below a predetermined level.

Generally, the angle at which daylight strikes buildings varies depending on the time of day and time of year. In the morning, the sun is low on the horizon, and sunlight can strike the side of a building at a nearly perpendicular (horizontal) angle. During the middle of the day, the sun is at its highest point in the sky, and sunlight can strike on a building at a nearly parallel (vertical) angle. During the summer, the highest altitude of the sun as well as the width of its azimuth are both greater than in the winter. Thus, the angle needed to reflect sunlight to a fixed location changes throughout the day, and also changes from day to day. The most important feature of the present invention is its ability to track the sun and provide the most efficient reflecting angle regardless of the time of day or time of year. This is accomplished by a variably angled reflecting surface.

The reflecting surface has an upper edge and a lower edge. The reflective surface may be a mirror, reflective prism, reflective film, or any other reflective material. The upper edge is positioned closer to the daylight source than the lower edge. The upper edge remains in a constant location, although it may be able to move, if necessary, as the lower edge is adjusted. However, as described in more detail below, a length of reflective film comprising the reflective surface and attached to the lower edge may be pulled over a roller at the stationary upper edge as the position of the lower edge is adjusted. The lower edge of the reflective surface is adjustable, so the orientation of the reflective surface changes as the lower edge is moved. If the reflective surface is of a fixed length, such as a mirror, then the lower edge will occupy more space in the interior of the building when the reflecting surface is at a steeper (i.e. substantially vertical) angle. In the preferred embodiment, the reflective surface comprises a thin reflective film. The lower end of the film is mounted on a roller. As the angle of the reflective surface changes from a substantially horizontal angle to a substantially vertical angle, less reflective surface area is needed to provide maximum reflection. Thus, the roller moves along a track and takes up the film material not used for reflection. By using this mechanism, the height of the entire device can be kept to a minimum, while still providing the maximum reflective surface area necessary to take full advantage of the daylight entering the device.

The means for adjusting the angle of the reflective surface can be accomplished by several methods. In the preferred embodiment, the lower end of the reflective film is attached to a spring-loaded roller. Adjustment of the angle of the reflective surface is accomplished by mounting the roller on a dolly which is attached to a travel bar. The dolly may be moved along the travel bar by a threaded worm drive rod. A DC stepper motor is attached to the threaded worm drive rod. As the motor turns the drive rod, the dolly moves along the travel bar, moving the roller. As the roller moves, the reflective film is either taken up or let out on the roller, providing the adjustment of the reflective film. The spring loaded feature of the roller keeps the reflective film taut at all times.

Instead of having one end of a reflective film fixed at its upper edge and the lower edge mounted on a roller, other configurations are possible without departing from the spirit of the invention. For example, the roller may be positioned at the upper edge of the reflective surface, and the lower end of the reflective surface may be attached to a horizontal rod, the center of which is connected to the dolly. When the dolly is moved along the track, the reflective film will be wound and unwound from the roller at the top edge instead of the bottom edge. Another configuration is for both the top and bottom edges of the reflective film to wrap around horizontal rods, and to be secured by means located beneath the reflective surface. A spring loaded roller may be positioned beneath the reflective surface to take up any slack in the film as the lower edge of the reflective surface is moved. Additionally, the top and bottom edges of the reflective film may be connected together to form a circular band. This band may be placed around two rods forming the upper and lower ends of the reflective surface. The lower rod may be attached to the dolly to provide appropriate adjustment of the reflective surface. Any suitable means positioned beneath the reflective surface may be used to eliminate any slack in the circular band of reflective film as the lower rod is moved.

Furthermore, many other means may be used to provide adjustment of the lower edge of the reflective surface. For example, the means used to form the lower edge of the reflective surface may be moved by wires connected to a pully or other suitable mechanism.

The adjustment means described above allow the device to reflect daylight at the appropriate vertical angle. In order for the invention to reflect daylight into a building at the appropriate horizontal angle (i.e. not reflect the sunlight more towards one side of a room more than the other), the reflected sunlight should be projected from the invention at a substantially perpendicular angle. Since the sun moves across the sky throughout the day, sunlight will not always strike the device at a perpendicular angle. This shortcoming can be corrected by placing a series of louvers on the device. When mounted at the exterior aperture of the device, these louvers, which are similar to horizontally mounted venetian blinds, reflect sunlight into the device at a prependicular angle. As with the angle of the reflective surface, a means may be provided for the angle of the louvers to automatically and simultaneously track the sun across the sky so that the reflected light is always perpendicular to the invention. In addition, these louvers may be closed at night to suppress both radiant and convective heat transfer through the device.

In order for the device to track the movement of the sun across the sky, the reflective surface and louvers must be continuously adjusted. Although such adjustment may be accomplished manually, this method is unduly burdensome. The preferred embodiment utilizes controlled DC stepper motors connected to both the reflective surface adjustment means and the louver adjustment means. The extent of adjustment depends on several factors, including the longitude and latitude of the building in which the device is located, the direction the exterior aperture of the device is facing, the day of year and time of day, and the exact angle the light is desired to be reflected into the building. Given these considerations, any individual skilled in the art may determine the appropriate angles for both the reflective surface and louvers. Given the accuracy with which DC stepper motors may be controlled, they are the preferred method of providing automatic adjustment. These motors may easily be connected to a computer programmed to send appropriate currents to the DC stepper motors to provide automatic adjustment throughout the day and throughout the year.

As noted above, it is desirable for daylight reflected from the device to be reflected at an angle perpendicular to the device. Another method which may be used to partially offset the effect of unevenly distributed light from the device into a room is through the use of strips of glazing or reflective material positioned along the top of edge of a wall adjacent to the ceiling. As light is reflected out of the device at a non-perpendicular angle, it strikes the strips, which reflect the light back towards the interior of the room. This results in a dispersion of light into areas of a room where it is more useful.

At times, intense daylight shining into the invention may cause an excessive amount of light to be reflected into the interior of a building. This may also have the effect of increasing the temperature inside the invention, which can lead to a deterioration of its component parts. For these reasons, a vent may be placed in the housing of the invention to provide a source of discharge for excessive heat.

DETAILED DESCRIPTION OF THE DRAWINGS

Figure 1:
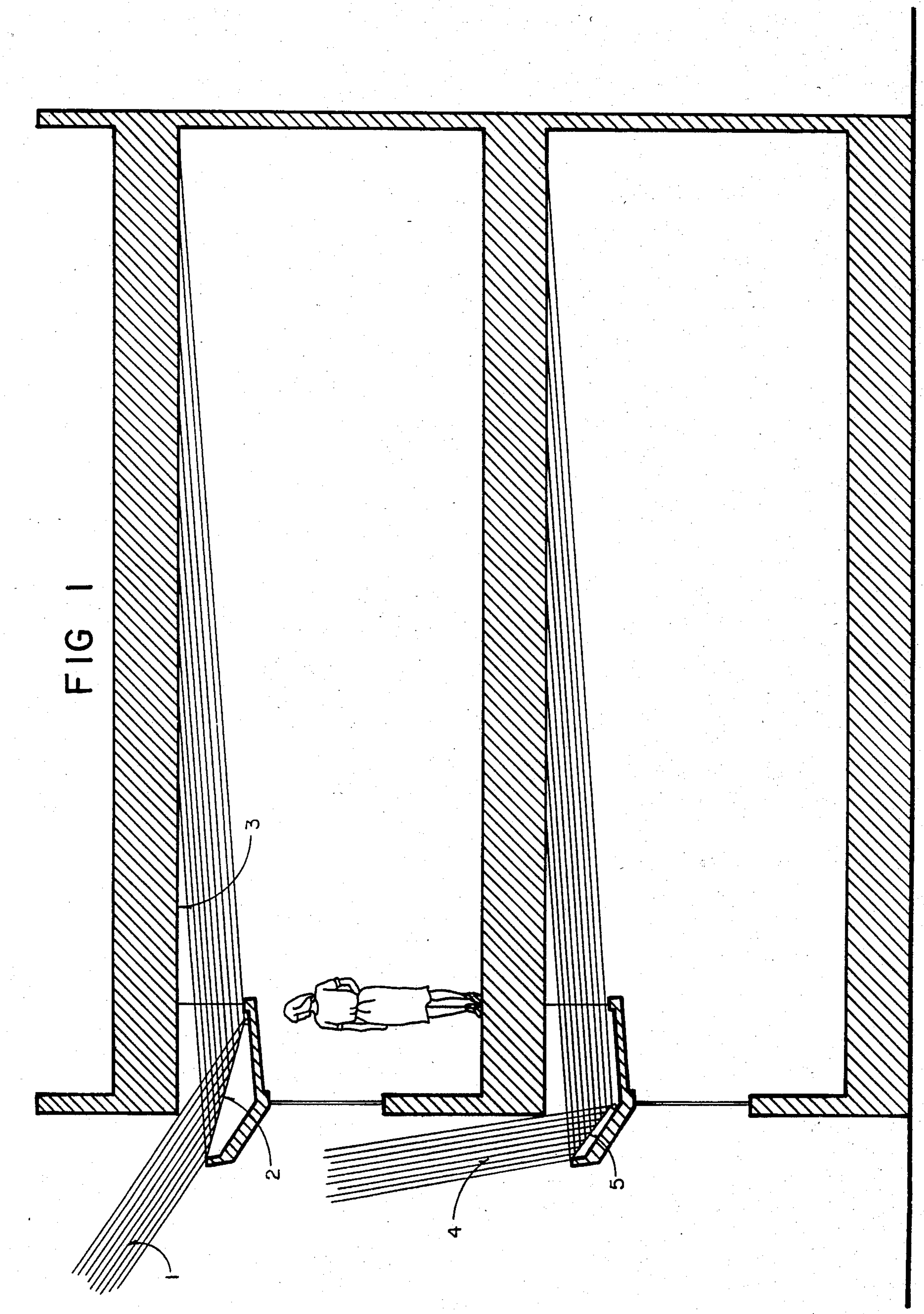
FIG. 1 is cross-sectional view of a two story structure having embodiments of the invention installed on both floors. Daylight is shining upon the structure at a different angle for each floor. This figure shows how the reflective surface adjusts to project light into the interior of the structure at the same angle, despite variances in the angle at which light enters the device.

FIG. 1 is cross-sectional view of a two story structure having embodiments of the invention installed on both floors. The view in FIG. 1 allows the adjustment of the angle and surface area of the reflective surface to accommodate different daylight angles to be appreciated. Daylight is shining upon the structure at a different angle for each floor. On the upper floor, daylight 1 strikes the structure from a relatively low angle. Reflective surface 2 reflects the daylight against the interior ceiling 3. When the daylight is projected from a relatively low angle, the reflective surface should be at a lower (closer to horizontal) angle. On the lower floor, daylight 4 strikes the structure from a relatively steep angle. This requires reflective surface 5 to be positioned at a steeper angle than for low-angle daylight in order to achieve the same reflective angle into the structure. In addition, a smaller reflective surface is needed when reflecting daylight from steeper angles.

Figure 2:
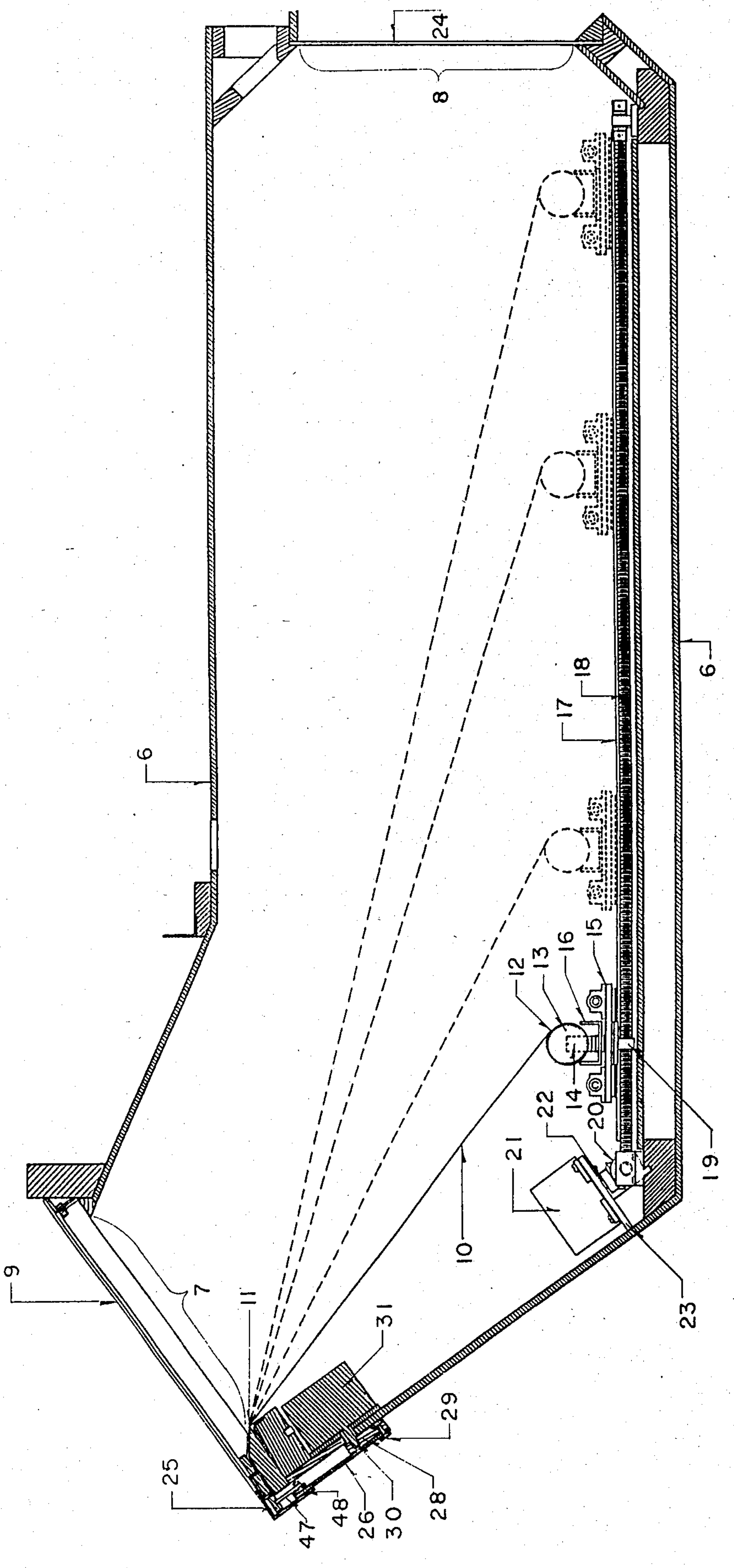
FIG. 2 is a cross-sectional view of the preferred embodiment of the invention.

FIG. 2 is a cross-sectional view of a preferred embodiment of the invention, showing different positions of the reflective surface. The invention is comprised of an exterior housing 6 having an exterior aperture 7 and an interior aperture 8. Each aperture may be covered by glazing 9 and 24 to keep the interior clean. Reflective film 10 has an upper edge 11 and a lower edge 12. The lower edge 12 is secured to spring-loaded roller 13. Roller 13 is biased to roll up reflective film 10 as the roller 13 is moved closer to the top edge of the reflective film 11 (to the left in the drawing.) The roller 13 is held in place by mounting each end on an L-bracket 14, which is secured to the end of C-channel 16. C-channel 16 runs the entire length of the roller 13, and is secured in the middle to dolly 15. Dolly 15 is mounted on track 17, and can move along the entire length of the track. As dolly 15 moves away from reflective film upper edge 11 (to the right in the drawing,) reflective film 10 is unwound from roller 13 and kept taut by the bias of the roller. Track 17 is secured to housing 6 at each end.

Adjacent to track 17 and below one edge of dolly 15 is threaded drive rod 18. Nut 19 is attached to the bottom of dolly 15, and is threaded through the threaded drive rod 18. Thus, as threaded drive rod 18 is rotated, dolly 15 and roller 13 move along track 17, in a direction determined by the direction of rotation of threaded drive rod 18. Threaded drive rod 18 may be secured to either housing 6 or to track 17, in order to provide structural stability.

One end of threaded drive rod 18 is inserted into gear box 20. DC stepper motor 21 has a shaft 22 extending into gear box 20, so that rotation of shaft 22 causes threaded drive rod 18 to rotate. DC stepper motor 21 is secured to housing 6 by mounting bracket 23.

A series of adjacently mounted louvers are positioned below exterior aperture glazing 9. Each louver has an attachment pin 25 connected to a louver lever arm 47. Each louver lever arm is connected to a single connecting bar 48. As control bar 48 is moved in a manner perpendicular to the longitude of the louvers, all of the louvers simultaneously rotate. By controlling the angle of the louvers, daylight entering exterior aperture 9 may be reflected to strike reflective surface 10 at a perpendicular angle. This prevents the daylight from being reflected primarily to one side of an interior room as opposed to the opposite side of an interior room.

Control of the position of the louvers is accomplished by attaching connecting bar 48 to drive bar 26, which in turn is secured to semicircular disk 28 via screw 29. The center of semicircular disk 28 is mounted on drive shaft 30, which extends from DC stepper motor 31. As DC stepper motor 31 turns drive shaft 30, semicircular disk 28 rotates. This causes drive bar 26 and connecting bar 48 to rise or fall, depending on the direction of rotation. This action causes each louver to simultaneously rotate, effecting a change in the overall orientation of the set of louvers. By directing the apertures between the louvers at the source of daylight, the daylight is reflected against reflective surface 10 at a horizontal angle perpendicular to the interior aperture.

The width of each louver should be at least as wide as the distance between each louver. This allows all of the louvers to be placed in an essentially coplanar position, which "closes" the exterior aperture. This position suppresses both radiant and convective heat transfer through the device.

Figure 3:
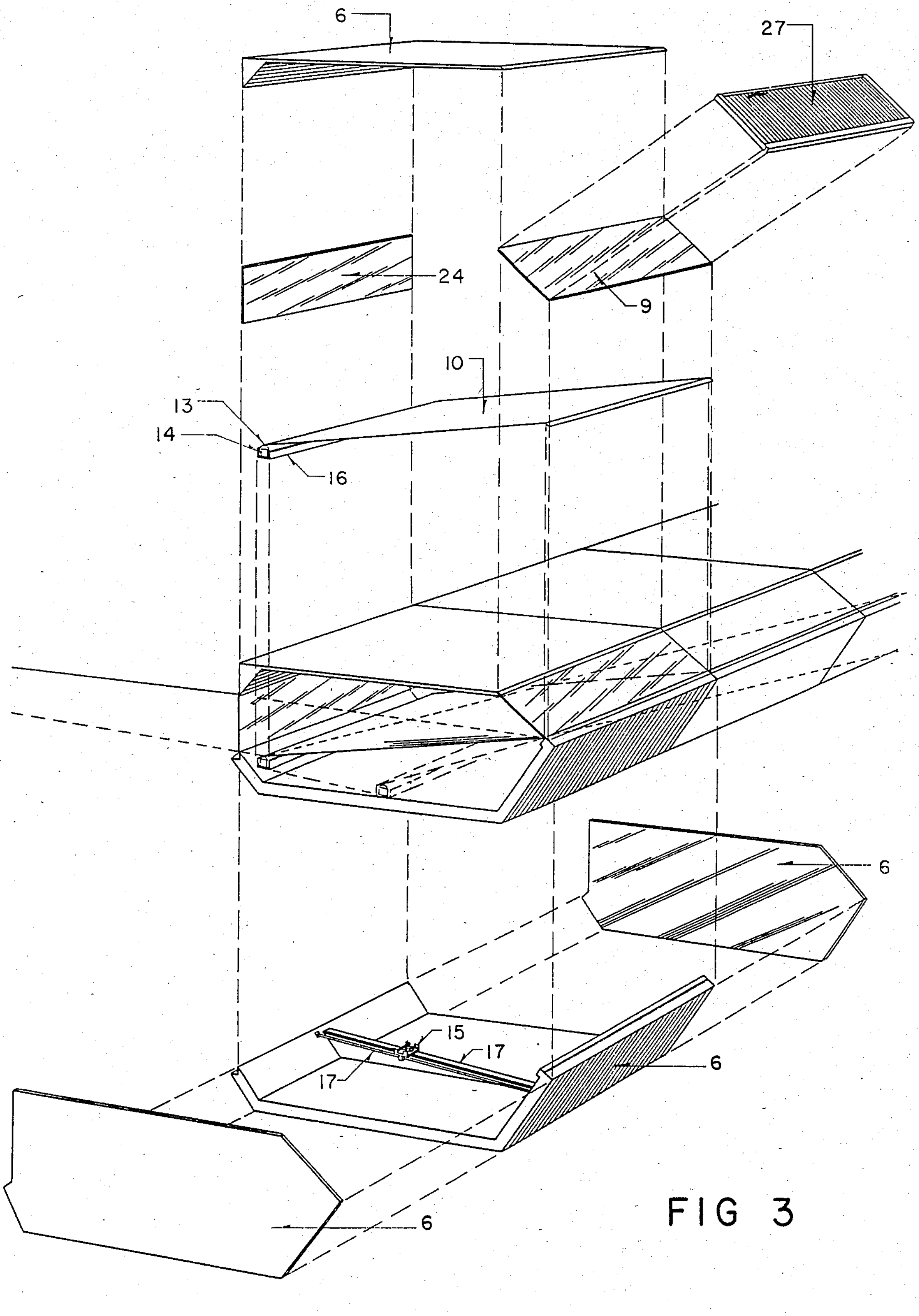
FIG. 3 is an exploded perspective drawing of the preferred embodiment of the the invention.

FIG. 3 is an exploded perspective drawing of the preferred embodiment of the invention. By viewing this drawing, the construction of the component parts described above may be more fully appreciated. In addition, it may be appreciated that multiple units of the invention may be conveniently placed adjacent to one another to form an atractive appearance and provide interior daylighting across an entire width of a building.

Figure 4:
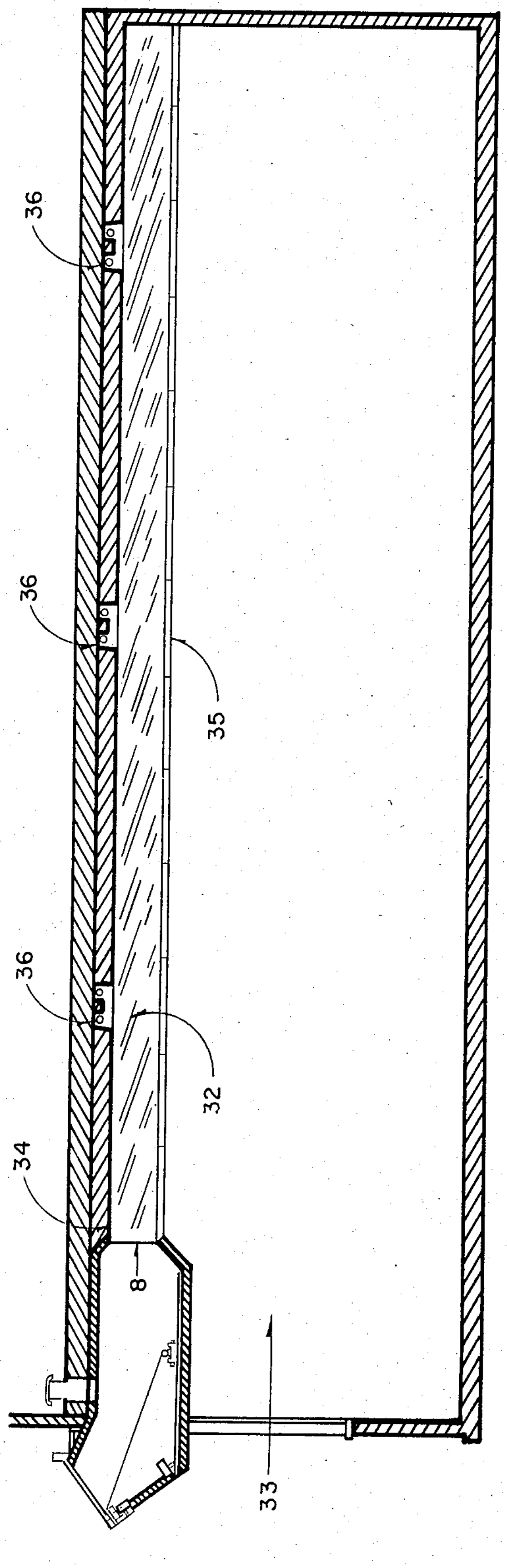
FIG. 4 is a cross-sectional view of a room employing both the invention and a reflective strip mounted on one side wall along the ceiling of the room.

FIG. 4 is a cross-sectional view of a room employing both the invention and a reflective strip mounted on one side wall along the ceiling of the room. As noted above, light may not always exit the device into a room at an angle perpendicular to the device. This shortcoming may be partially compensated by installing a reflective strip 32 along the side wall 33 of a room adjacent to the ceiling 34. These reflective strips reflect any non-perpendicular daylight entering the room from the invention back towards the interior of the room. In addition, a suspended ceiling diffuser 35 may be positioned in the room parallel to the ceiling and below interior aperture 8. This acts to further disperse the daylight projected into the room by the invention. Additionally, artificial lighting fixtures 36 may be installed in the ceiling of the room to provide light at night and during periods when daylight is insufficient.

Figure 5:
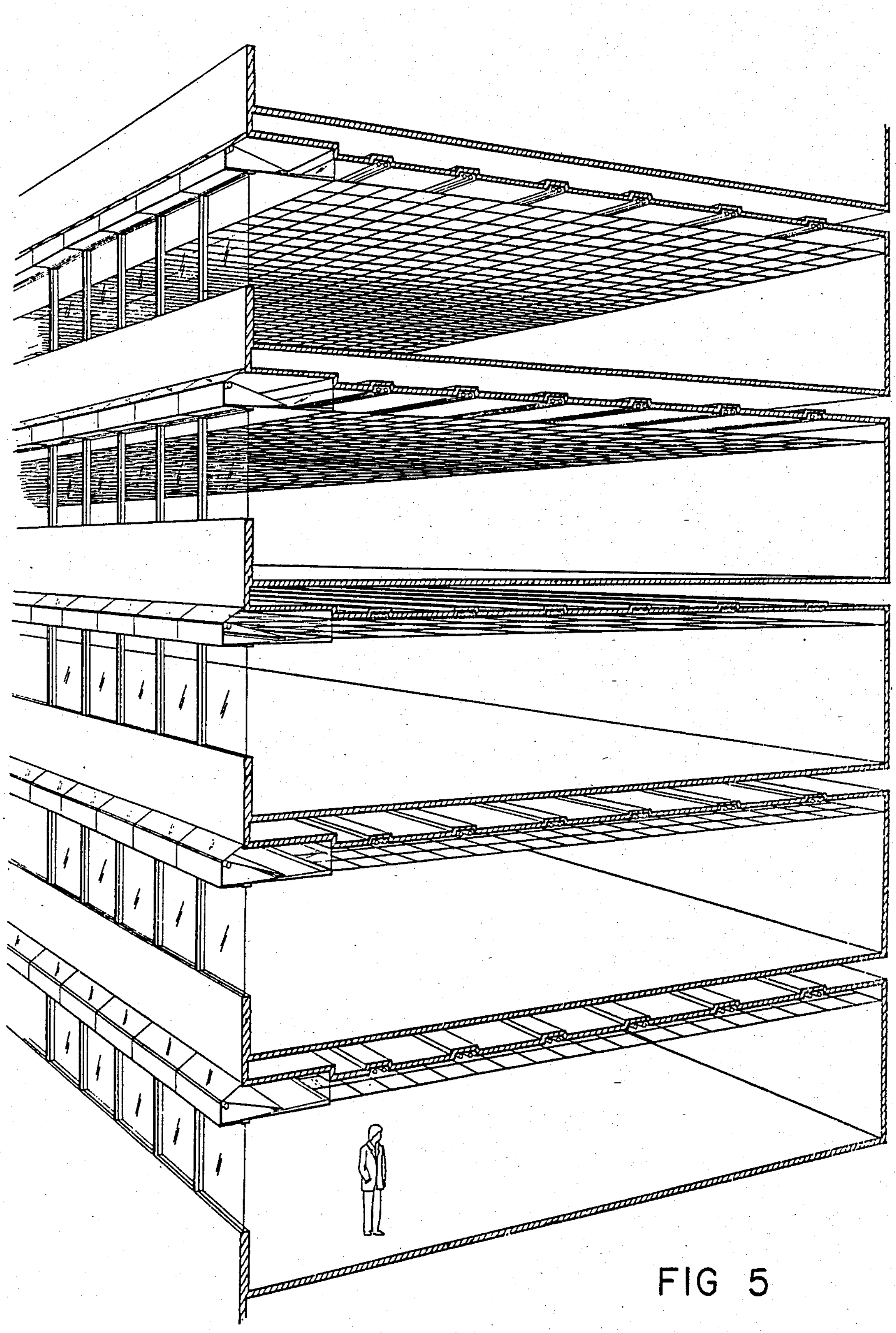
FIG. 5 is a perspective view of several embodiments of the invention mounted adjacent to each other and on different stories of a building.

FIG. 5 is a perspective view of several embodiments of the invention mounted adjacent to each other and on different stories of a building. This Figure illustrates the ease with which the present invention may be incorporated in the design of existing and future buildings in an aesthetically pleasing manner. As with FIG. 4, this Figure discloses the use of artificial lighting fixtures to provide additional interior light when needed.

Figure 6:
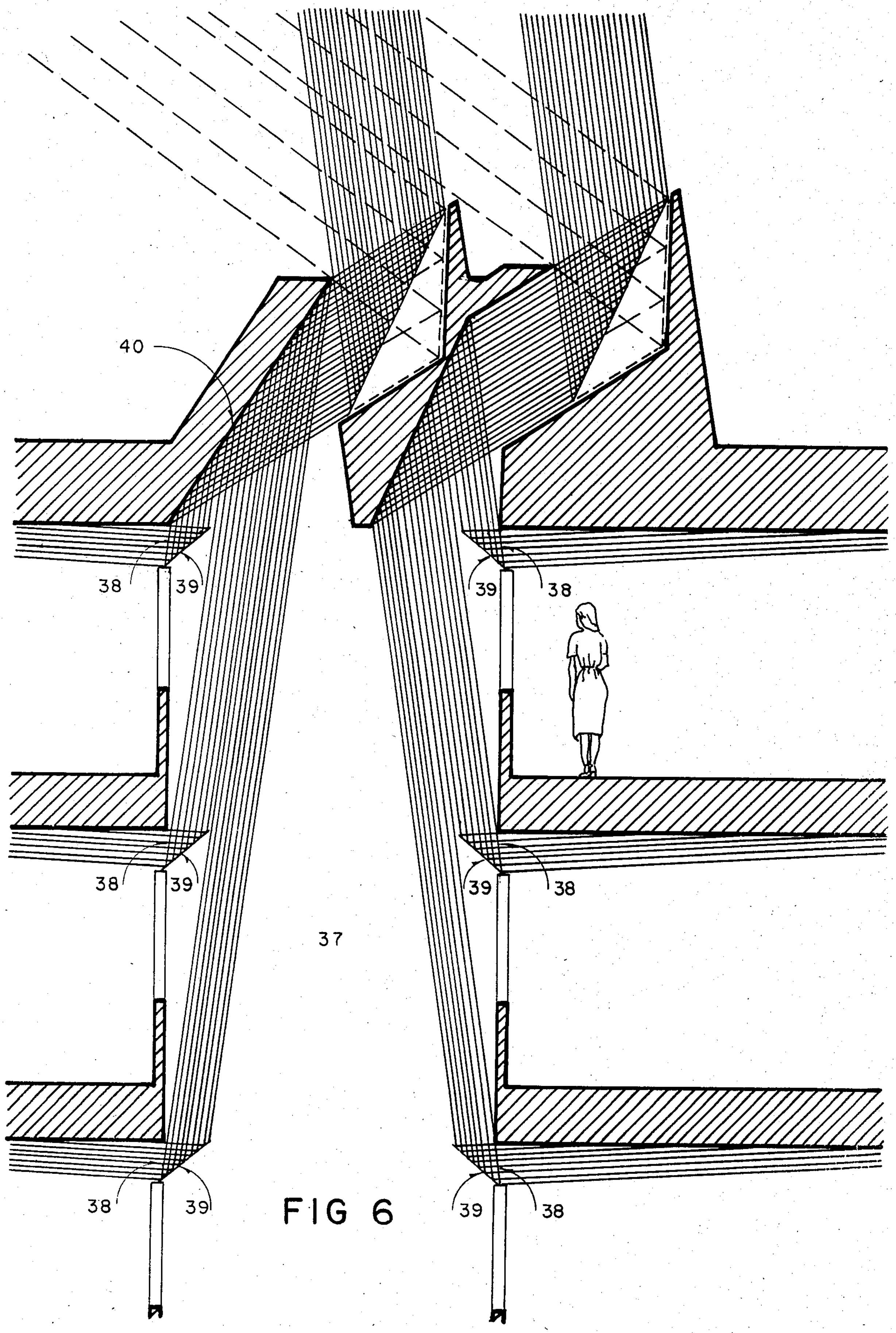
FIG. 6 is a cross-sectional view of the invention being used in a structure having a light shaft.

FIG. 6 is a cross-sectional view of the invention being used in a structure having a light shaft 37. Each floor abutting the light shaft has an opening 38 to the light shaft. Mirrors or other suitable reflective surfaces 39 may be mounted below the opening of each floor in a manner to reflect light projected down the light shaft. Each such mirror 39 remains fixed and need not be moved once initially adjusted to dimensions of the particular building in which it is situated. A larger mirror or reflective surface 40 may be mounted at the top of the light shaft and positioned to reflect light to the series of mirrors 39 mounted on each floor. Again mirror 40 may be fixed. An embodiment of the invention may then be placed opposite mirror 40 to capture daylight and reflect it on mirror 40.

Figure 7:
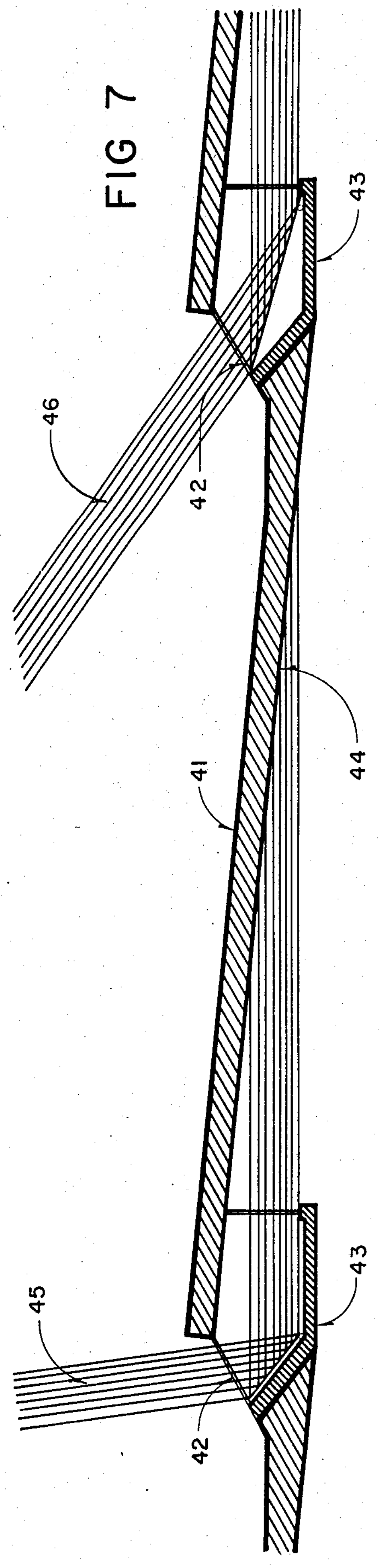
FIG. 7 is a cross-sectional view of a preferred embodiment of the invention employed in a tilted roof structure.

FIG. 7 is a cross-sectional view of a preferred embodiment of the invention employed in a tilted roof structure. Tilted roof 41 contains periodic apertures 42 between upper and lower portions. The invention 43 may be installed in these periodic apertures to reflect light against the interior ceiling of the structure 44. Such positioning can accommodate daylight emanating from various angles, as indicated by daylight 45 and 46.

Figure 8:
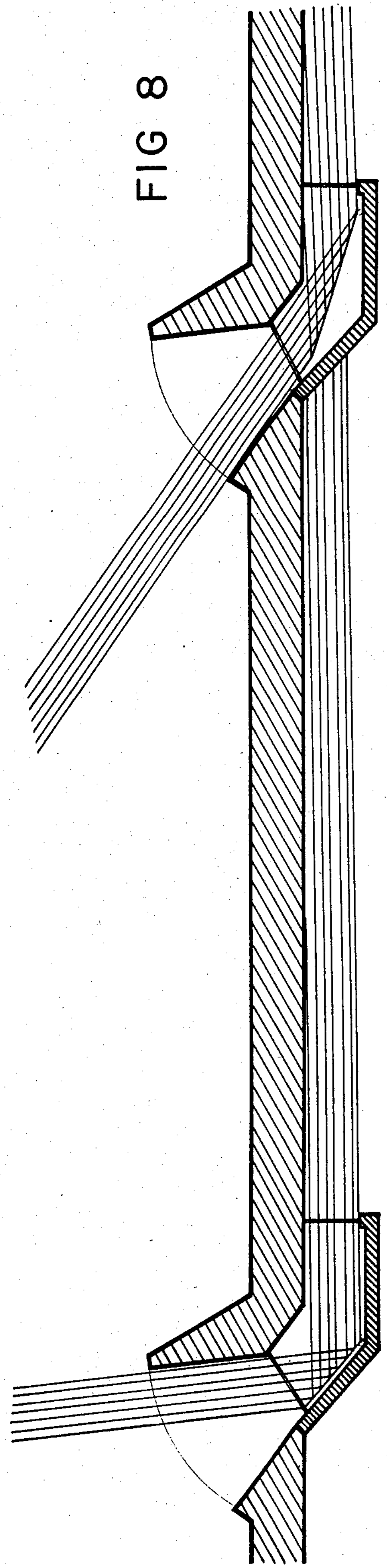
FIG. 8 is a cross-sectional view of a preferred embodiment of the invention employed in a flat roof structure.

FIG. 8 is a cross-sectional view of a preferred embodiment of the invention employed in a flat roof sturcture. The concept employed in this configuration is substantially similar to that disclosed in FIG. 7.

Figure 9:
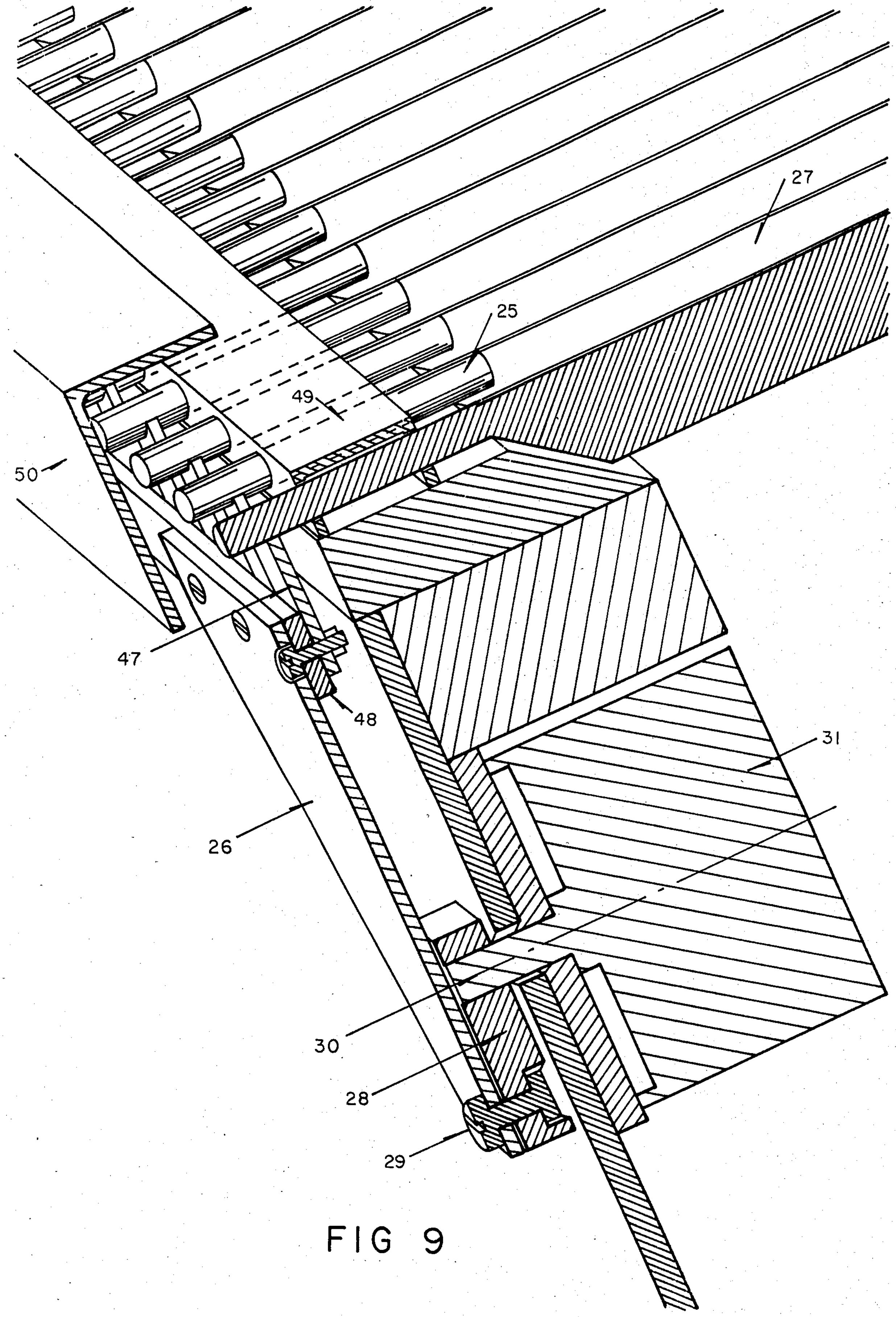
FIG. 9 is a sectional perspective of louvers and the control mechanism employed in the preferred embodiment of the invention.

FIG. 9 is a sectional perspective of louvers and the control mechanism which may be employed in the invention. Several equally sized louvers 27 are positioned adjacent to each other. Each louver has an attachment pin 25 extending from its end. The louvers are held in place by inserting each attachment pin through louver frame 49. The end of each attachment pin 25 has a louver lever arm 47 attached thereto. Each louver lever arm 47 is secured to control arm 48. Thus, as control arm 48 is moved, each louver lever arm is simultaneously moved, rotating the louvers 27. Control arm 48 is attached to drive bar 26, which in turn is secured to semicircular disk 28 via screw 29. The center of semicircular disk 28 is attached to shaft 30 of motor 31. Thus, motor 31 controls the orientation of louvers 27 via the above mechanism. The top edge of the louver frame 49, louver levers 47 and control arm 48 are protected from dirt and damage by exterior frame cover 50.

I claim:

1. A device for projecting daylight into a structure comprising:

(a) a housing having an exterior aperture and an interior aperture;

(b) a reflective surface comprised of a flexible reflective material inside the housing, said reflective surface having an upper edge and a lower edge;

(c) means for adjusting the angle of the reflective surface with respect to the exterior aperture, such that light entering the exterior aperture may be reflected by the reflective surface through the interior aperture;

(d) means for defining the lower edge of the reflective surface;

(e) means for moving said lower edge defining means;

(f) means for keeping the reflective material substantially taut as the lower edge defining means is moved.

2. The device claimed in claim 1 wherein:

the reflective material is comprised of a reflective mylar film.

3. The device claimed in claim 1, wherein:

the means for defining the lower edge of the reflective surface is a rod, said rod being situated underneath the reflective film and being substantially parallel to the upper edge of the reflective surface.

4. The device claimed in claim 1 wherein:

the means for defining the lower edge of the reflective surface is a roller to which the reflective film is attached, said roller being substantially parallel to the upper edge of the reflective film.

5. The device claimed in claim 4 wherein the means for keeping the reflective film substantially taut is comprised of:

means for rotatively biasing the roller in a direction such that any slack reflective film is kept wound around the roller.

6. The device claimed in claim 5 wherein the means for rotatively biasing the roller is comprised of a spring loaded mechanism inside said roller.

7. The device claimed in claim 1 wherein the means for moving the lower edge defining means is comprised of:

(a) mounting said lower edge defining means on a dolly;
(b) the dolly being mounted on a track, such that the dolly may be moved along the track.

8. The device claimed in claim 7, further comprising:

(a) female threads located on said dolly;
(b) a threaded drive shaft having male threads;
(c) the threaded drive shaft being threaded through the female threads located on said dolly;
(d) such that rotating the threaded drive shaft causes the dolly to move along the track.

9. The device claimed in claim 1, further comprising means for automatically controlling the adjustment of the angle of the reflective surface with respect to the exterior aperture by moving said lower edge.

10. The device claimed in claim 9 wherein:

the means for automatically controlling the adjustment of the angle of the reflective surface with respect to the exterior aperture is comprised of attaching the means for moving said lower edge defining means to an electric motor, the movement of which may be precisely controlled.

11. The device claimed in claim 10, further comprising:

control means for the electric motor, such that the movement of the motor may cause the reflective surface to be positioned at angles which cause substantially all light entering the exterior aperture to be reflected through the interior aperture.

12. The device claimed in claim 1, further comprising glazing covering the external aperture.

13. The device claimed in claim 1, further comprising glazing covering the internal aperture.

14. The device claimed in claim 1, further comprising:

(a) means for reflecting light entering the exterior aperture such that the light is reflected through the interior aperture at an angle substantially perpendicular to the interior aperture.

15. The device claimed in claim 14, wherein the means recited therein is comprised of:

(a) a plurality of adjacently placed parallel louvers;
(b) positioned such that light passing through the exterior and interior apertures also passes through the louvers;
(c) louver rotating means on each louver;
(d) means for commonly connecting each louver rotating means;
(e) means for simultaneously rotating each louver by adjusting the means for commonly connecting each louver rotating means.

16. The device claimed in claim 15, further comprising means for automatically controlling the means for sumultaneously rotating each louver.

17. The device claimed in claim 16, wherein the means for automatically controlling the means for simultaneously rotating each louver is comprised of an electric motor connected to the means for commonly connecting each louver rotating means, the movement of which may be precisely controlled.

18. The device claimed in claim 17, further comprising:

control means for the electric motor, such that the movement of the motor may cause the plurality of louvers to be positioned at angles which cause substantially all light passing through said louvers to be reflected through the interior aperture at an angle substantially perpendicular to the lower edge of the interior aperture.

19. The device claimed in claim 15, wherein the plurality of louvers may be adjusted such that no light may pass through the louvers.

20. The device claimed in claim 1, wherein:

the upper edge of the reflective surface is defined by a rod situated underneath the reflective surface.

21. The device claimed in claim 20, wherein:

the means for defining the lower edge of the reflective surface is a rod situated underneath the reflective surface, said rod being substantially parallel to the upper edge of the reflective film.

22. The device claimed in claim 3, wherein:

the upper edge of the reflective surface is defined by a rod situated underneath the reflective surface.

23. The device claimed in claim 1, wherein:

the upper edge of the reflective surface is defined by a roller to which the reflective film is attached.

24. The device claimed in claim 23, wherein the means for keeping the reflective film substantially taut is comprised of:

means for rotatively biasing the roller in a direction such that any slack reflective film is kept wound around the roller.

25. The device claimed in claim 24 wherein the means for rotatively biasing the roller is comprised of a spring loaded mechanism inside said roller.

* * * * *